(12) United States Patent
Pons et al.

(10) Patent No.: US 7,368,297 B2
(45) Date of Patent: May 6, 2008

(54) METHOD FOR FORMING CATALYTIC SITES AT THE SURFACE OF A SUPPORT

(75) Inventors: Michel Pons, La Tronche (FR); Francis Baillet, Paladru (FR)

(73) Assignee: Institut National Polytechnique de Grenoble, Grenoble cedex (FR)

( * ) Notice: Subject to any disclaimer, the term of this patent is extended or adjusted under 35 U.S.C. 154(b) by 921 days.

(21) Appl. No.: 10/494,289

(22) PCT Filed: Nov. 7, 2002

(86) PCT No.: PCT/FR02/03828

§ 371 (c)(1),
(2), (4) Date: May 3, 2004

(87) PCT Pub. No.: WO03/039726

PCT Pub. Date: May 15, 2003

(65) Prior Publication Data

US 2004/0261694 A1    Dec. 30, 2004

(30) Foreign Application Priority Data

Nov. 8, 2001   (FR)   ................................. 01 14466

(51) Int. Cl.
*H01L 21/00* (2006.01)
(52) U.S. Cl. .................... 438/1; 257/E29.167
(58) Field of Classification Search ...................... 438/1
See application file for complete search history.

(56) References Cited

U.S. PATENT DOCUMENTS

| | | | |
|---|---|---|---|
| 4,005,186 A | | 1/1977 | Ficalora et al. |
| 4,605,678 A | * | 8/1986 | Brennan et al. ............. 518/700 |
| 5,496,729 A | * | 3/1996 | Monticello ................... 435/282 |
| 6,048,960 A | * | 4/2000 | Cerea ........................ 528/483 |
| 6,121,007 A | * | 9/2000 | Martin et al. ................ 435/7.6 |
| 6,136,961 A | * | 10/2000 | Dordick et al. .............. 536/7.4 |
| 6,177,270 B1 | * | 1/2001 | Martin et al. ............. 435/235.1 |
| 6,217,732 B1 | | 4/2001 | Schuh et al. |

FOREIGN PATENT DOCUMENTS

EP        0 607 636        7/1994

* cited by examiner

*Primary Examiner*—Alexander Ghyka
(74) *Attorney, Agent, or Firm*—Young & Thompson

(57) ABSTRACT

A method for forming catalytic sites at the surface of a support, which includes: depositing on the surface a liquid film (3) containing elements (4) of a living matter, capable of moving when subjected to an electric and/or magnetic field and designed to form catalytic traces or alterations at the surface of the substrate; applying an electric and/or magnetic field to the film such that, under the effect of the field, at least some of the living matter elements move and assemble on zones of the substrate surface; and eliminating the liquid film and the living matter at the substrate surface while allowing the traces left by the living element at the substrate surface to subsist so as to constitute the catalytic sites at the locations of the traces.

7 Claims, 6 Drawing Sheets

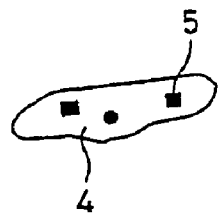
FIG_1
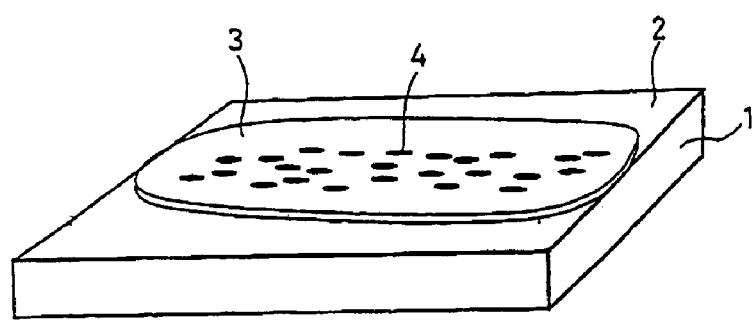
FIG_2

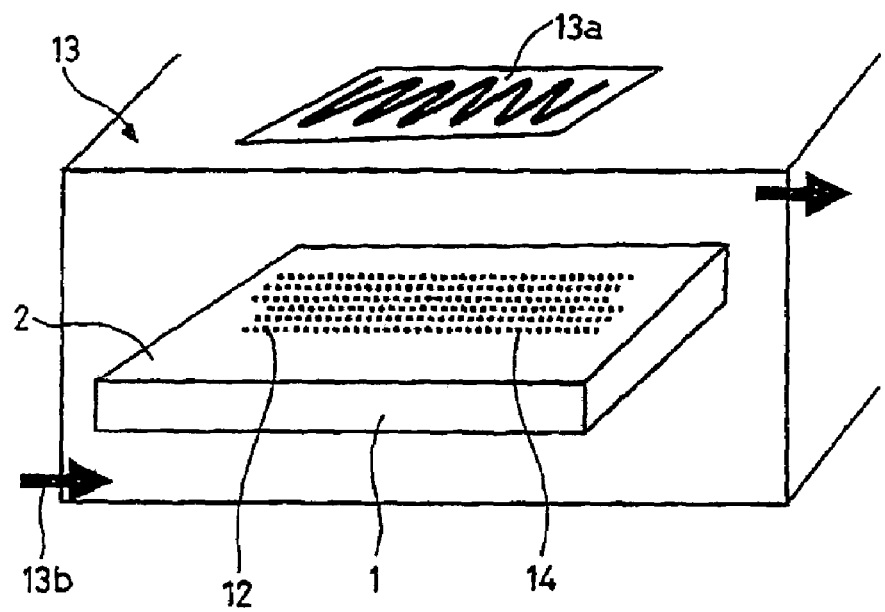
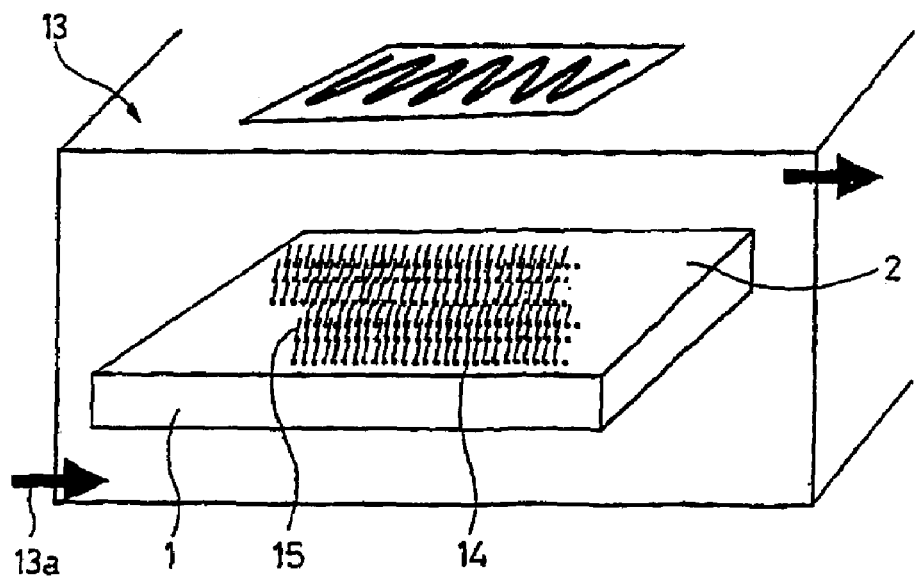

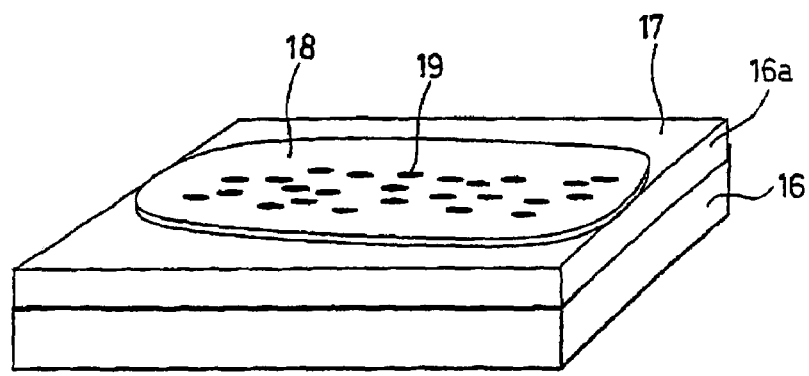
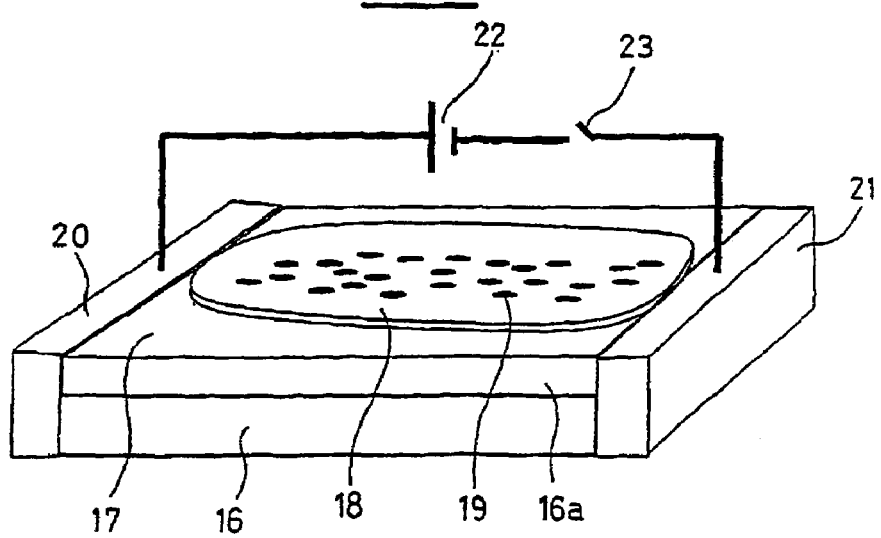

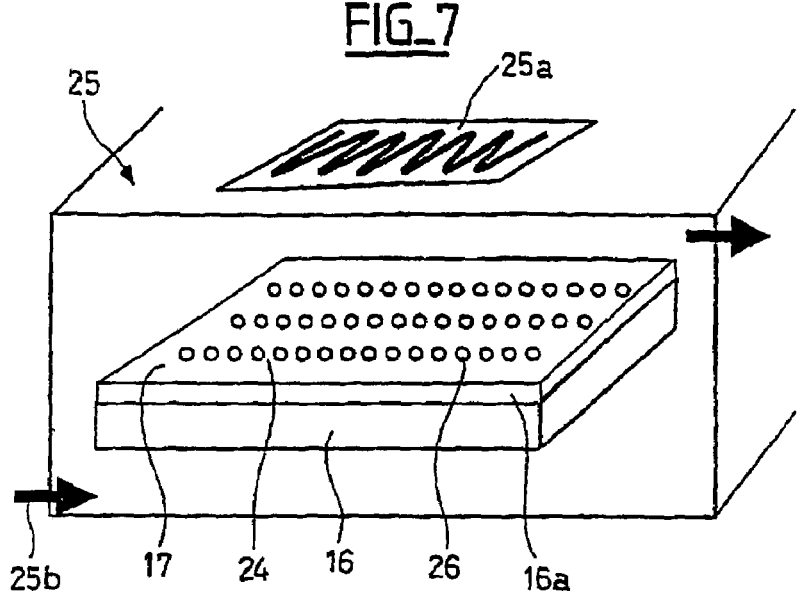
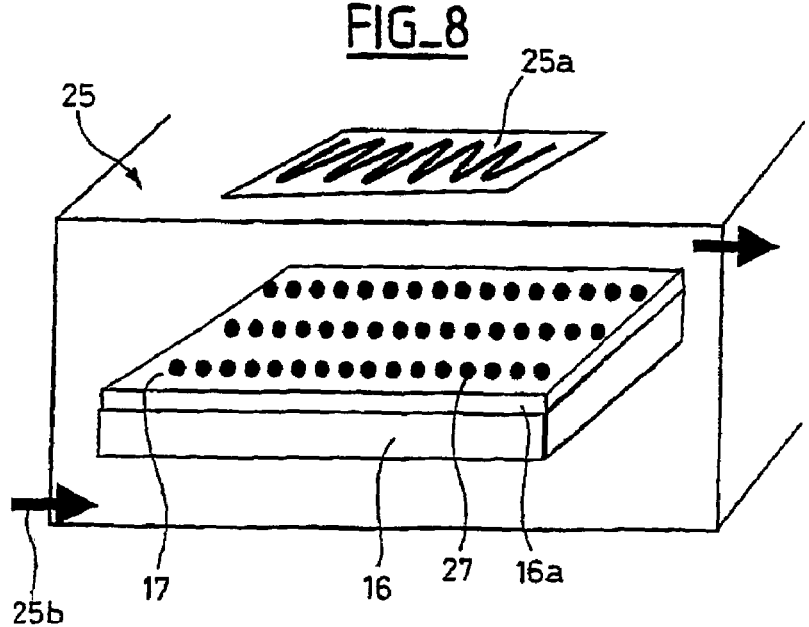

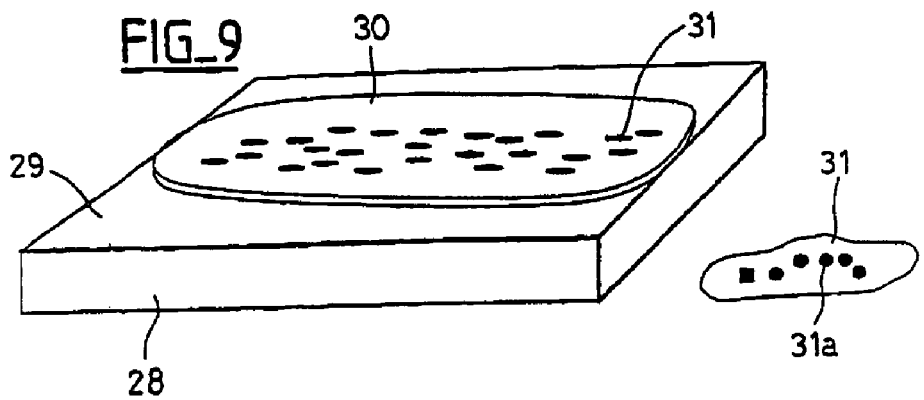
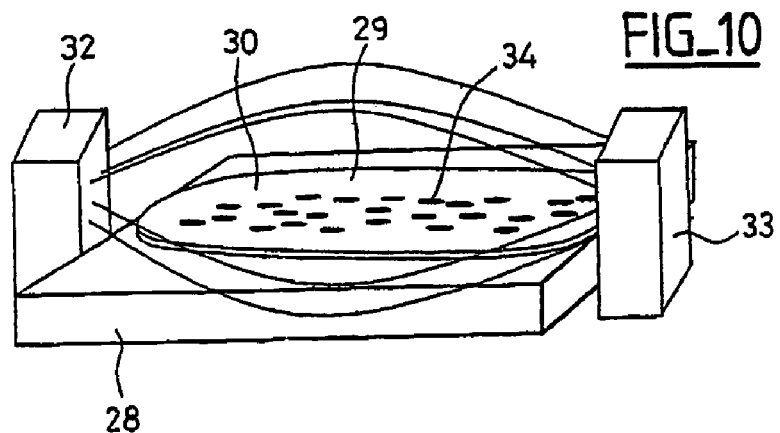
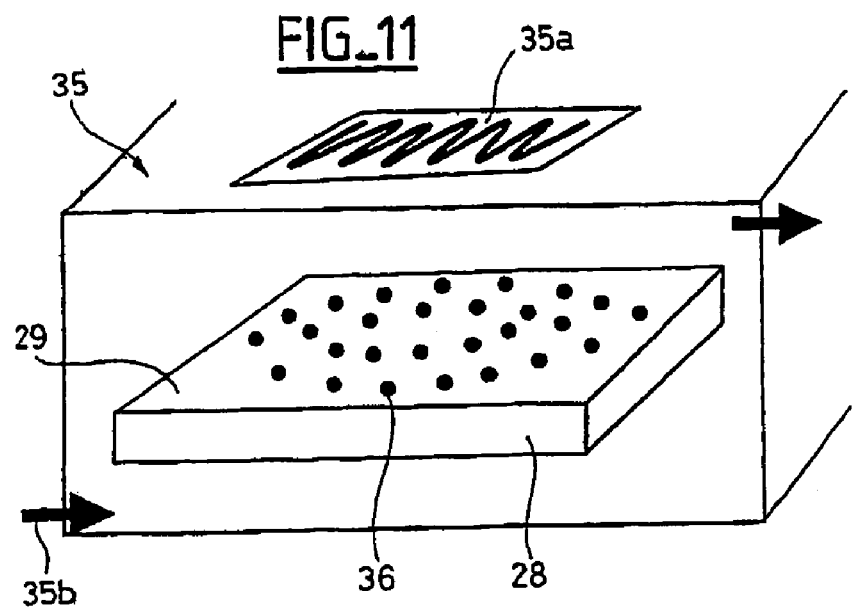

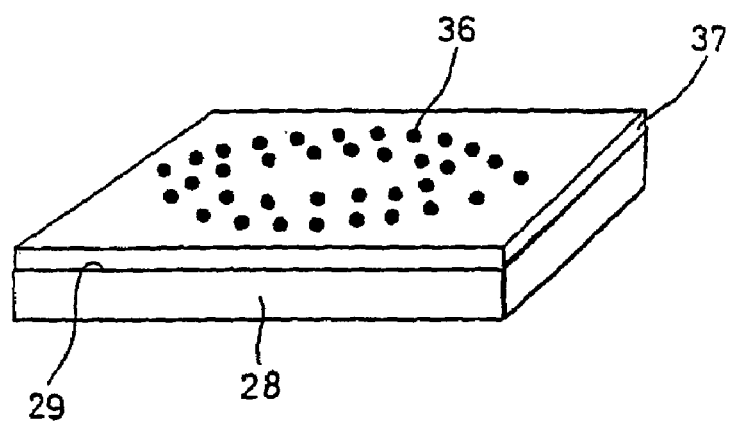
FIG_12
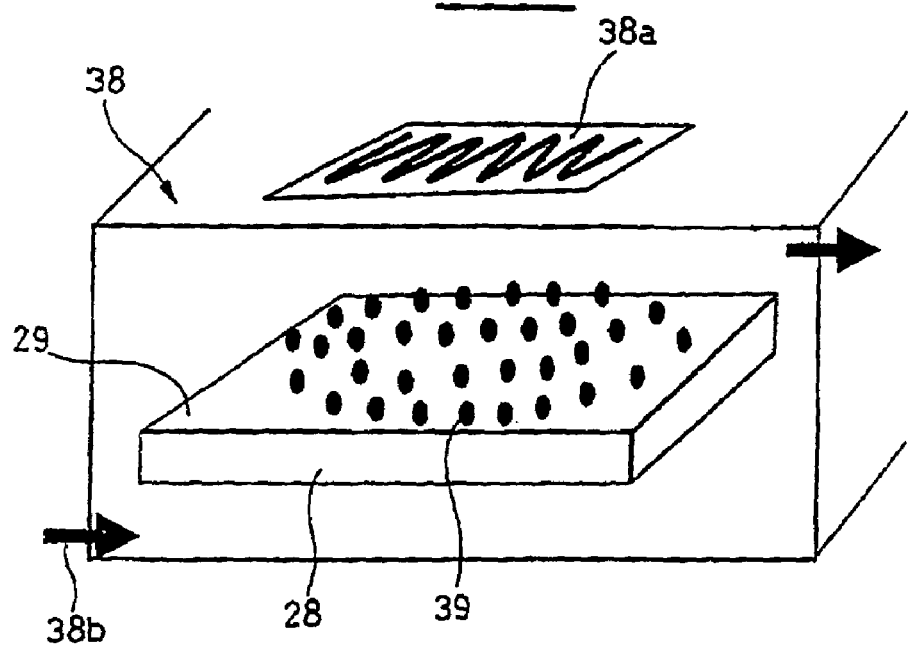
FIG_13

METHOD FOR FORMING CATALYTIC SITES AT THE SURFACE OF A SUPPORT

The present invention relates to a method for forming catalytic sites at the surface of a substrate.

Document FR-A-97 19 158 describes a method for locally promoting the growth of a deposit of a material by gas-solid reaction at the surface of a substrate. For this, it is proposed, in that document, to bond to a crystalline support a thin film of the same material, conferring on it a slight disorientation of its crystalline structure compared to that of the support. A compensation for this disorientation then occurs, through the creation of perfectly organized defects or dislocations which are located at the interface of the bonding and which generate constraints throughout the entire structure, and more particularly up to the surface of the thin film on which are generated organized fields of constraint. These organized fields of constraint then constitute sites on which the above-mentioned growth of a deposit is promoted.

The techniques presented above comprise many difficulties either of implementation or of feasibility.

A subject of the present invention is a method for forming catalytic sites at a surface of a substrate which is completely different from that described above.

According to the present invention, this method consists: in depositing on said surface a liquid film containing elements of a living matter, capable of moving when they are subjected to an electric and/or magnetic field and able to form catalytic traces or alterations at the surface of the substrate; in applying an electric and/or magnetic field to said film such that, under the effect of this field, at least some of said elements of living matter move and assemble on zones of the substrate surface; and in eliminating the liquid film and the living matter while allowing the catalytic traces left by said elements of living matter at the substrate surface to remain so as to constitute said catalytic sites at the locations of these traces.

According to a variant of the invention, the method consists in using a living matter carrying elements sensitive to said electric and/or magnetic field, these elements remaining on said catalytic sites of the substrate surface after elimination of the liquid film and of the living matter.

According to the invention, the method preferably consists in using a living matter carrying metal elements.

According to another variant of the invention, the method consists in using a living matter able to alter the substrate surface via a biological and/or chemical action when it is brought to said zones of the substrate surface, these altered zones constituting said catalytic sites.

According to the invention, said eliminating operation is carried out by drying.

According to the invention, the method preferably consists, after said eliminating operation, in carrying out an operation to deposit a material able to deposit selectively on said catalytic traces of said catalytic sites so as to constitute in particular islands of said material which are spaced out.

According to the invention, the method preferably consists in carrying out said depositing operation by gas-solid or liquid-solid reaction.

In general, the term "catalytic site" is intended to mean a location at which a reaction able to engender the depositing of a material is promoted.

The present invention will be understood more clearly on studying various modes of obtaining catalytic sites, described by way of nonlimiting examples and illustrated by the drawing in which:

FIGS. 1 to 4 show the main steps of a first mode of obtaining catalytic sites;

FIGS. 5 to 8 show the main steps of a second mode of obtaining catalytic sites; and FIGS. 9 to 13 show the main steps of a third mode of obtaining catalytic sites.

EXAMPLE 1

With reference to FIG. 1, it is seen that there is a substrate or support 1 which is parallelepipedal in shape, preferably made of an electrical insulating material, which has an upper surface 2.

A mineral or aqueous liquid film 3 containing elements 4, of microscopic size, of a living matter is deposited on this surface 2. This film 3 is deposited in such a way that it has a substantially constant thickness and that the elements 4 of living matter are distributed in the liquid film 3, preferably evenly.

This living matter is chosen such that these elements 4 contain, over its periphery and/or within its membrane, particles 5 made of metal or dissolved metal.

With reference to FIG. 2, it is seen that electricity-conducting parallel plates 6 and 7 are then placed at the ends of the surface 2 of the substrate 1 such that these plates are in contact with opposite zones 8 and 9 of the liquid film 3.

The plates 6 and 7 are connected to an electrical energy source 10, via a control means such as a switch 11.

By activating this control means 11, the plates 6 and 7 are supplied with electrical energy and an electric or magnetic field is then generated in the liquid film 3.

The elements 4 of living matter, under the effect of this electric field which is applied to the metal particles 5 which they carry, move or migrate in the liquid film 3 and assemble on zones 12 corresponding substantially to the field lines of the electric field generated.

As shown in FIG. 3, the substrate 1 is then placed in an oven 13 equipped with a heating means 13a and a gas inlet 13b. A temperature of approximately 1000 degrees and an atmosphere for reducing the metal particles 5 are maintained, so as to cause, by drying, the elimination of the liquid film 3 and the elimination of the elements 4 of living matter, while allowing the traces consisting of reduced particles 5 to remain and without substantially changing their positions and their spacing at the surface 2 of the substrate 1.

It results therefrom that the metal particles 5 which were carried by the elements 4 of living matter become deposited or remain on the zones 12 of the surface 2 of the substrate 1, into which they have migrated, these zones being formed substantially along rectilinear lines which are parallel to one another.

Catalytic sites 14 formed at the locations of the metal particles 5 which remain, and distributed in an organized manner at the surface 2 of the substrate 1 are then obtained over the face 2 of the substrate 1.

When the surface 2 is approximately two centimeters in width and approximately five centimeters in length, the thickness of the liquid film 3 can be between 0.1 millimeter and one millimeter, and the concentration of the elements 4 of living matter can be between 0.5 microgram and five micrograms of proteins per milliliter, a bacterium consisting, in a manner known per se, of a large amount of proteins. The metal particles are generally less than a micron.

As shown in FIG. 4, a mixture of reactive gases can then be injected into the oven 13 in order to engender, by deposition, the germination or the growth of islands consisting of nanometric tubes or cylinders 15 preferentially at the organized catalytic sites 14 of the surface 2 of the substrate 1.

In an example of implementation, the substrate 1 can be a silicon oxide. The elements 4 of living matter can be bacteria of the Thiobacillus family and can carry, within their membrane or at their periphery, particles 5 of iron oxide.

After drying and reduction under a reducing atmosphere of hydrogen, catalytic sites 14 of nanometric particles of iron are obtained.

It is then possible to proceed, by deposition, by virtue of a gas-solid reaction under an atmosphere based on carbon, such as carbon dioxide, and on hydrogen, with a germination and a growth of islands consisting of nanometric tubes or cylinders 15 of carbon on the particles of iron.

EXAMPLE 2

With reference to FIG. 5, it is seen that, as in the preceding example, there is a substrate or support 16 which has an upper surface 17 on which is deposited a mineral liquid film 18 containing elements 19 of a living matter.

The material or the matter constituting the surface 17, or an upper layer of this substrate or this substrate itself, and the living matter are chosen such that the living matter is able to alter the substrate surface via a biological and/or chemical reaction.

With reference to FIG. 6, it is seen that, as in the preceding example, the elements 19 of living matter are preferably immediately subjected to an electric or magnetic field via two opposite plates 20 and 21 connected to an electrical energy source 22 controlled by a means 23, in such a way that the elements 19 of living matter migrate and assemble on zones 24 of the surface 17 of the substrate 16.

Since the electric field is maintained in such a way as to fix the positions of the elements 19 of living matter, these elements 19 alter the surface 17 of the substrate 16 via a biological or chemical action or attack at the locations where they are placed.

In a variant of execution, the substrate could be placed in a chamber in which a gaseous atmosphere for activating a biological or chemical action or attack of the elements 19 of living matter could be maintained.

As shown in FIG. 7, the substrate 16 is then placed in an oven 25 equipped with a heating means 25a and a gas inlet 25b, so as to cause an operation for drying and eliminating the liquid 18 and the elements 19 of living matter.

There then remain catalytic traces of attack constituting catalytic sites 26 spaced out on the zones 24 of the surface 17 of the substrate 16, at the locations to where the particles 19 of living matter were brought.

In an example of implementation, the substrate 16 can be covered with a fine layer 16a of a sulfide or of a sulfate and the living matter can be made up of bacteria of the Thiobacillus family having the property of being able to solubilize the chosen sulfide or sulfate.

In particular, the layer 16a can be made of iron sulfide such that the biological or chemical attack by elements 19 of living matter engenders a consumption of the fine layer of iron sulfide so as to leave particles of iron on the zones 24, which constitute the catalytic sites 26.

With reference to FIG. 8, it is seen that it is then possible, as in the preceding example, to inject a suitable reactive gas into the oven 25 in order to obtain a germination or a growth of nanometric islands 27 of carbon preferentially on the organized catalytic sites 26 of the surface 17 of the substrate 16.

EXAMPLE 3

With reference to FIG. 9, it is seen that, as in the preceding examples, there is a substrate or support 28 which has an upper surface 29 on which is deposited a mineral liquid film 30 containing elements 31 of a living matter.

In this example, the elements of living matter are "magnetostatic" bacteria, which have the property of orienting themselves in a magnetic field by virtue of the fact that they contain ferromagnetic or ferri-magnetic particles 31a generally called magnetosomes, of approximately 0.3 micron.

As shown in FIG. 10, the substrate 28 is then placed between the poles 32 and 33 of a magnetic system, which poles are placed on either side of the ends of the surface 29, which generates a magnetic field under the effect of which the elements 31 of living matter migrate and become positioned on zones 34 determined by the field lines of the magnetic field created.

As shown in FIG. 11, the substrate is then placed in an oven 35 for drying and for eliminating the liquid 30 and the elements 31 of the living matter, equipped for this purpose with a heating means 35a and a gas inlet 35b. Catalytic sites 37 made up of the magnetosomes 31a assembled in the zones 34 then remain on the surface 29 of the substrate 28.

As shown in FIG. 12, the magnetosomes 31a which remain on the surface 29 are fixed by virtue of a deposited layer 37, without modifying the positions and the spacing of the magnetosomes 31a determining the catalytic sites 36.

With reference to FIG. 13, a gas-solid or liquid-solid reaction is carried out, as in the preceding examples, in an oven 38 equipped with a heating means 38a and a gas inlet 38b, so as to obtain destruction of the thin layer 37 and germination or growth of a material 39 such as carbon or copper by electrolytic deposition on the organized catalytic sites 36 at the surface 29 of the substrate 28.

It results from the examples described that the catalytic sites and the islands of deposits obtained can be used, according to the material of which they are composed, in particular as electrical connection elements, as electron emission elements or as elements for producing devices using a Coulomb blocking phenomenon, in particular in the field of the manufacture of semiconducting components such as emitters, field-effect transistors, detectors or memories, and more generally in the microelectronic field.

The present invention is not limited to the examples described above. Many variants are possible without departing from the context defined by the attached claims.

The invention claimed is:

1. A method for forming catalytic sites at a surface of a substrate, characterized in that it consists:
   in depositing on said surface a liquid film (3) containing elements (4) of a living matter, capable of moving when they are subjected to an electric and/or magnetic field and able to form catalytic traces or alterations at the surface of the substrate;
   in applying an electric and/or magnetic field to said film such that, under the effect of this field, at least some of said elements of living matter move and assemble on zones of the substrate surface;

and in eliminating the liquid film and the living matter while allowing the catalytic traces left by said elements of living matter at the substrate surface to remain so as to constitute said catalytic sites (14) at the locations of these traces.

2. The method as claimed in claim 1, characterized in that it consists in using a living matter carrying particles (5) sensitive to said electric and/or magnetic field, these particles constituting said catalytic sites of the substrate surface after elimination of the liquid film and of the living matter.

3. The method as claimed in claim 2, characterized in that it consists in using a living matter carrying particles made of metal.

4. The method as claimed in claim 1, characterized in that it consists in using a living matter able to alter the substrate surface via a biological and/or chemical action when it is brought to said zones of the substrate surface, these altered zones (36) constituting said catalytic sites.

5. The method as claimed in claim 1, characterized in that said eliminating operation is carried out by drying.

6. The method as claimed in claim 1, characterized in that it consists, after said eliminating operation, in carrying out an operation to deposit a material able to deposit selectively on said catalytic traces of said catalytic sites so as to constitute in particular islands (15, 27, 39) of said material which are spaced out.

7. The method as claimed in claim 6, characterized in that it consists in carrying out said depositing operation by gas-solid or liquid-solid reaction.

* * * * *